United States Patent
Kitamura et al.

(10) Patent No.: US 7,997,888 B2
(45) Date of Patent: Aug. 16, 2011

(54) DIE FOR FORMING HONEYCOMB STRUCTURE AND MANUFACTURING METHOD OF DIE FOR FORMING HONEYCOMB STRUCTURE

(75) Inventors: Kazumasa Kitamura, Ichinomiya (JP); Tomoki Nagae, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/624,651

(22) Filed: Nov. 24, 2009

(65) Prior Publication Data

US 2010/0143529 A1    Jun. 10, 2010

(30) Foreign Application Priority Data

Dec. 5, 2008   (JP) ................................. 2008-310357

(51) Int. Cl.
*B29C 47/06* (2006.01)
*B29C 47/20* (2006.01)

(52) U.S. Cl. ..................... 425/380; 156/89.22; 156/252; 156/268; 156/285; 264/177.12; 425/467

(58) Field of Classification Search .................. 425/380, 425/461, 467; 264/177.12; 156/89.22, 252, 156/268, 285
See application file for complete search history.

(56) References Cited

U.S. PATENT DOCUMENTS

| | | | |
|---|---|---|---|
| 7,713,050 B2 * | 5/2010 | Takahashi et al. | 425/380 |
| 2005/0118296 A1 | 6/2005 | Kaneko et al. | |
| 2006/0034972 A1 | 2/2006 | Takahashi et al. | |
| 2008/0113858 A1 | 5/2008 | Kaneko et al. | |
| 2009/0232927 A1 * | 9/2009 | Takahashi et al. | 425/464 |

FOREIGN PATENT DOCUMENTS

| | | |
|---|---|---|
| JP | 2000-326318 A1 | 11/2000 |
| JP | 2003-285308 A1 | 10/2003 |
| JP | 2006-051682 A1 | 2/2006 |

* cited by examiner

*Primary Examiner* — Yogendra N Gupta
*Assistant Examiner* — Joseph Leyson
(74) *Attorney, Agent, or Firm* — Burr & Brown (57) ABSTRACT

A die for forming a honeycomb structure is provided with back pores through which a forming material is introduced and slits through which the forming material is extruded into a lattice-like shape, and the die comprises a first plate-like member made of a super hard alloy containing tungsten carbide and a bonding agent and provided with the back pores extending in a thickness direction; and a second plate-like member bonded to the first plate-like member, made of the super hard alloy containing tungsten carbide and the bonding agent, and provided with the slits connected to the back pores, wherein the bonding agent is dispersed in a lesser amount in a bonded part between the first plate-like member and the second plate-like member than in the other part.

8 Claims, 7 Drawing Sheets

FIG.5B (III)

BONDING (IV)

FIG.6

DIE FOR FORMING HONEYCOMB STRUCTURE AND MANUFACTURING METHOD OF DIE FOR FORMING HONEYCOMB STRUCTURE

BACKGROUND OF THE INVENTION

1. Field of the Invention

The present invention relates to a die for forming a honeycomb structure and a manufacturing method of a die for forming a honeycomb structure.

2. Description of the Related Art

As a manufacturing method of a ceramic honeycomb structure, heretofore a method has been broadly performed in which the honeycomb structure is formed by extrusion using a die for forming the honeycomb structure, including a die base member provided with back pores for introducing a forming material (clay) and lattice-like slits connected to the back pores. In this die, one surface of the die base member is usually provided with the slits each having a width corresponding to the thickness of each partition wall of the honeycomb structure and arranged in a lattice-like form or the like, and the opposite surface (the other surface) thereof is provided with the back pores connected to the slits and having large open areas. Moreover, the back pores are provided at such positions where the lattice-like slits or the like intersect with one another, and the back pores and the slits communicate with each other in the die base member. Therefore, a forming material such as a ceramic material introduced through the back pores move from the back pores having comparatively large inner diameters to the slits having small widths, and is extruded through the slits to obtain a formed honeycomb structure article.

As such a die base member of the die for forming the honeycomb structure, for example, a plate-like member (a die precursor) made of one type of alloy such as a stainless steel alloy or a super hard alloy, or a plate-like member (a die precursor) obtained by bonding two different types of plate-like members is used (e.g., JP-A-2000-326318, JP-A-2003-285308 and JP-A-2006-51682).

However, the forming material such as the clay or the like has a high hardness and easily causes wear, so that in the die for forming the honeycomb structure, the inner walls of the back pores or the slits need to be strong against the wear. It is considered that in the die for forming the honeycomb structure, one plate-like member made of the super hard alloy having the high hardness is cut to form the back pores and the slits therein, but it is technically difficult to bore the plurality of back pores and slits in the super hard alloy having the hardness, and there is also fear that the walls of the slits might break down owing to the hardness of the super hard alloy.

On the other hand, in the heretofore broadly used die for forming the honeycomb structure, constituted of the plate-like members made of different materials of the stainless steel alloy and the super hard alloy, a defect that the die breaks down does not easily occur owing to the softness of the stainless steel. However, when the stainless steel having a hardness lower than that of the super hard alloy is used, the labor of a wear countermeasure such as the coating of the inner walls of the back pores or the like is required. Therefore, even the die for forming the honeycomb structure, constituted of the plate-like members made of the different materials of the stainless steel alloy and the super hard alloy, cannot fundamentally solve any problem.

SUMMARY OF THE INVENTION

The present invention has been developed in view of the above problems, and an object thereof is to provide a die for forming a honeycomb structure, having a high wear resistance, and a manufacturing method of the die.

The present inventors have performed investigations for achieving the above object, and have found that plate-like members made of a super hard alloy can be bonded to each other on predetermined conditions while partially increasing the hardness of the plate-like members made of the super hard alloy, thereby completing the present invention. That is, according to the present invention, a die for forming a honeycomb structure and a manufacturing method of a die for forming a honeycomb structure are provided as follows.

A die for forming a honeycomb structure, provided with back pores through which a forming material is introduced and slits through which the forming material is extruded into a lattice-like shape, the die comprising: a first plate-like member made of a super hard alloy containing tungsten carbide and a bonding agent and provided with the back pores extending in a thickness direction; and a second plate-like member bonded to the first plate-like member, made of the super hard alloy containing tungsten carbide and the bonding agent, and provided with the slits connected to the back pores, wherein the bonding agent is dispersed in a less (i.e., lesser) amount in a bonded part between the first plate-like member and the second plate-like member than in the other part of the first plate-like member and the second plate-like member.

[2] The die for forming the honeycomb structure according to the above [1], wherein the bonding agent is dispersed in the least amount in a bonded interface where the first plate-like member and the second plate-like member are bonded, and dispersed so as to continuously or stepwise decrease toward the bonded interface in each of the first plate-like member and the second plate-like member.

[3] The die for forming the honeycomb structure according to the above [1] or [2], wherein the bonding agent is at least one metal selected from the group consisting of cobalt (Co), iron (Fe), nickel (Ni), titanium (Ti) and chromium (Cr).

[4] A manufacturing method of a die for forming a honeycomb structure, comprising:

a first plate-like member preparation step of forming a super hard material containing tungsten carbide and a bonding agent into a plate-like shape, followed by preliminary sintering, to prepare a first plate-like member;

a second plate-like member preparation step of similarly forming the super hard material into the plate-like shape, followed by the preliminary sintering, to prepare a second plate-like member;

a back pore processing step of forming back pores extending in a thickness direction through the first plate-like member;

a sintering step of sintering the first plate-like member and the second plate-like member in vacuum at 1300 to 1600° C. for 0.5 to 100 hours;

a bonding step of superimposing the first plate-like member and the second plate-like member after the sintering step to obtain a die precursor, and heating the die precursor at 1400 to 1500° C. for one to ten hours while applying a pressure of 10 MPa or less in the thickness direction to the contact surface of the first plate-like member and the second plate-like member; and a slit processing step of forming slits connected to the back pores in the second plate-like member after the bonding step.

[5] The manufacturing method of the die for forming the honeycomb structure according to the above [4], wherein the bonding agent is at least one metal selected from the group consisting of cobalt (Co), iron (Fe), nickel (Ni), titanium (Ti) and chromium (Cr).

[6] The manufacturing method of the die for forming the honeycomb structure according to the above [4] or [5], wherein the super hard material contains at least 75 to 95 mass % of the tungsten carbide and 5 to 25 mass % of the bonding agent.

The die for forming the honeycomb structure according to the present invention produces an effect of a high wear resistance. Moreover, by the manufacturing method of the die for forming the honeycomb structure according to the present invention, the die for forming the honeycomb structure, having the high wear resistance, can be obtained.

DESCRIPTION OF REFERENCE NUMERALS

1: honeycomb structure forming die, 2: first plate-like member, 3: second plate-like member, 4: back pore, 5: slit, 6: bonded part, 7: bonded interface, 8: squeezing portion, 8a: back pore squeezing portion, 8b: slit squeezing portion, 10: thickness direction, 11: introducing portion, 12: injecting portion, 13: slit bottom wall, 23: die precursor, 24: drill, 26: grindstone (slicer), 31: honeycomb structure, 32: partition wall, and 33: cell.

DETAILED DESCRIPTION OF THE INVENTION

Hereinafter, an embodiment of the present invention will be described with reference to the drawings. The present invention is not limited to the following embodiment, and can be altered, modified or improved without departing from the scope of the present invention. It is to be noted that in the following description, a reference numeral corresponding to the drawing is affixed to the end of a term on occasion. However, if the reference numeral is affixed to the end of the term, the technical scope of the present invention is not restricted or regulated by a configuration shown in the drawing. First, a die for forming a honeycomb structure according to the present invention will be described, and next a manufacturing method of the die (the manufacturing method of the die for forming the honeycomb structure according to the present invention) will be described.

Figure 1:
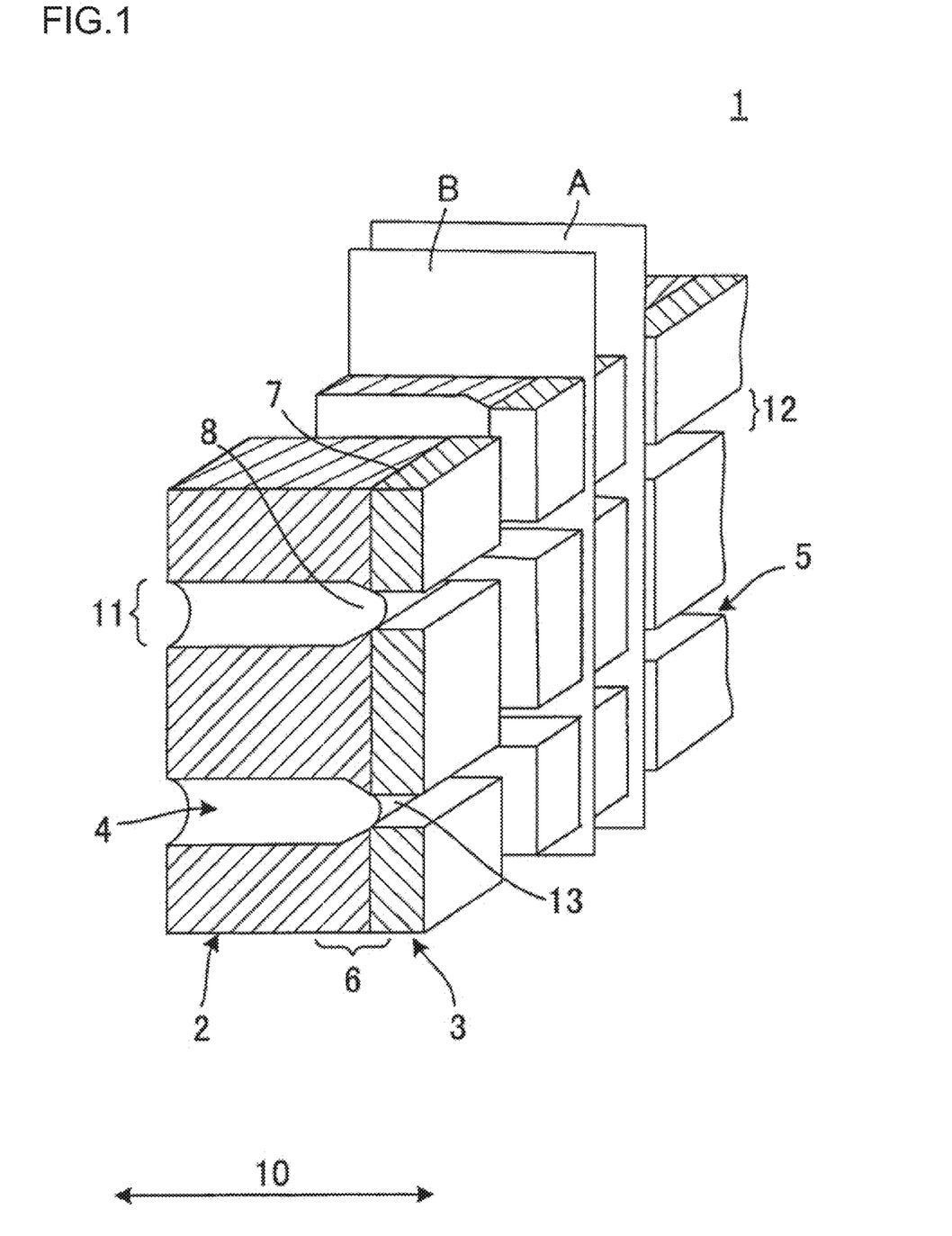
FIG. 1 is a perspective view schematically showing the structure of a part of one embodiment of a die for forming a honeycomb structure according to the present invention.
Figure 2:
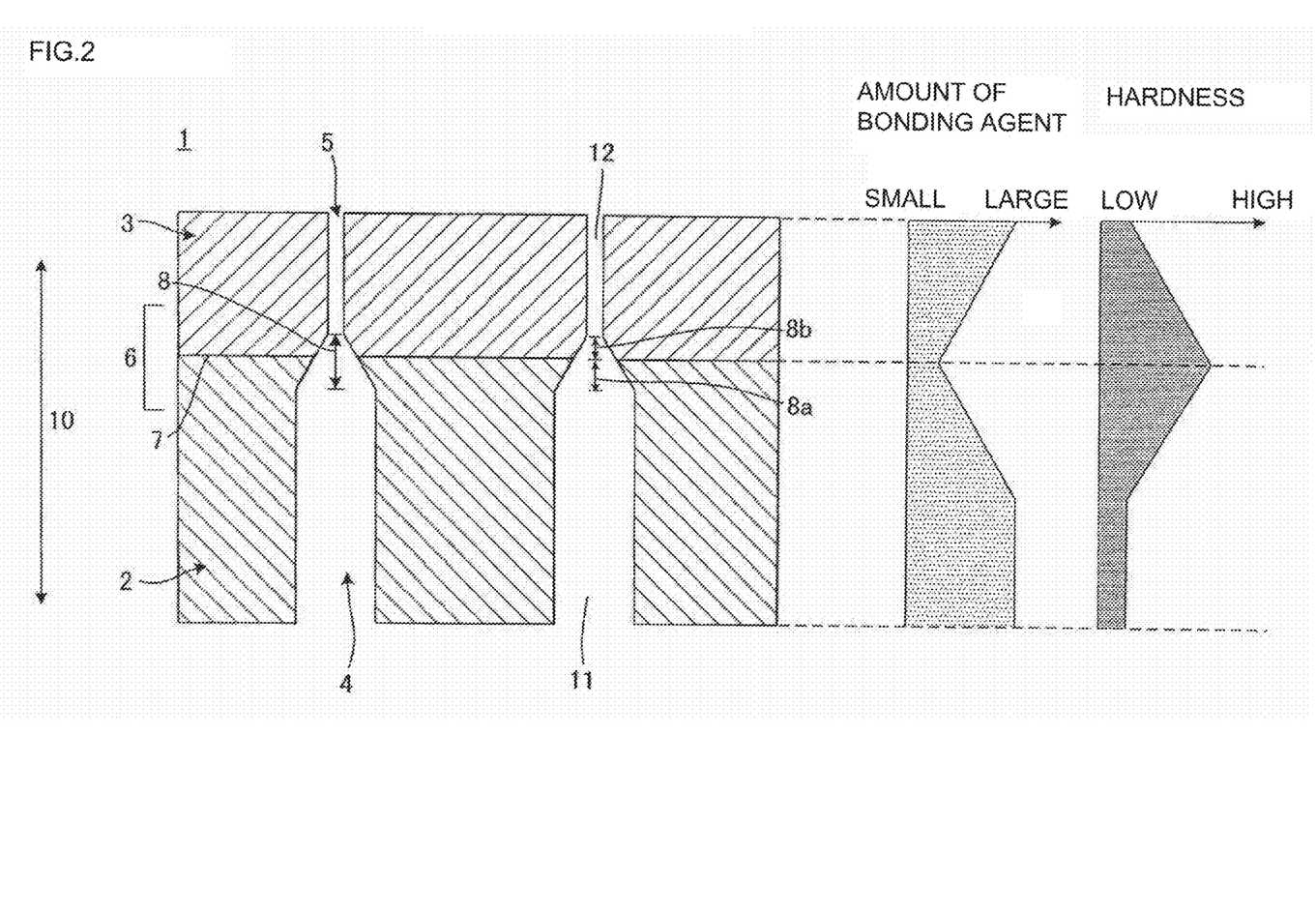
FIG. 2 shows a sectional view of the die for forming the honeycomb structure of FIG. 1 cut along a plane A vertically crossing back pores, and a diagram indicating the dispersion of a bonding agent in a super hard alloy and the hardness of the super hard alloy.
Figure 3:
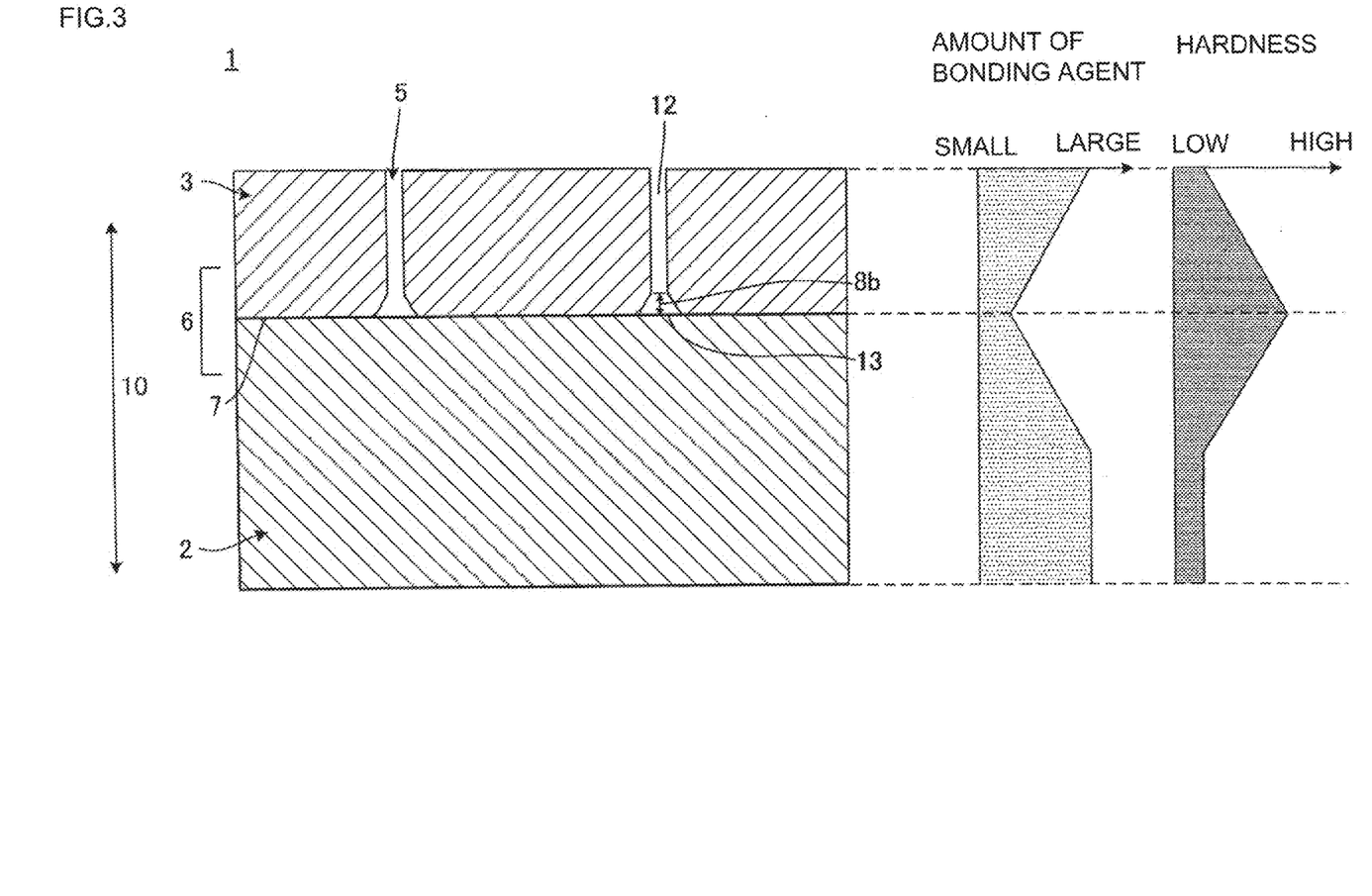
FIG. 3 shows a sectional view of the die for forming the honeycomb structure of FIG. 1 cut along a plane B which does not vertically cross the back pores, and a diagram indicating the dispersion of the bonding agent in the super hard alloy and the hardness of the super hard alloy.

A. Die for forming Honeycomb Structure:

A-1. Outline of Die for forming Honeycomb Structure according to the Present Invention:

FIG. 1 is a perspective view schematically showing the structure of a part of one embodiment of a die for forming a honeycomb structure according to the present invention. FIG. 2 shows a sectional view of the die for forming the honeycomb structure of FIG. 1 cut along a plane A vertically crossing back pores, and a diagram indicating the dispersion of a bonding agent in a super hard alloy and the hardness of the super hard alloy. FIG. 3 shows a sectional view of the die for forming the honeycomb structure of FIG. 1 cut along a plane B which does not vertically cross the back pores, and a diagram indicating the dispersion of the bonding agent into the super hard alloy and the hardness of the super hard alloy. The die will generally be described with reference to FIGS. 1 to 3. A honeycomb structure fowling die 1 of the present invention is provided with back pores 4 for introducing a forming material and slits 5 for extruding the forming material introduced through the back pores 4 in a lattice-like form. The honeycomb structure forming die 1 of the present invention is obtained by bonding a first plate-like member 2 and a second plate-like member 3. The first plate-like member 2 is provided with the back pores 4 extending in a thickness direction 10. The second plate-like member 3 is provided with the slits 5 connected to the back pores 4. Each of the first plate-like member 2 and the second plate-like member 3 is made of a super hard alloy containing tungsten carbide and a bonding agent. Furthermore, the bonding agent is dispersed in a less amount in a bonded part 6 between the first plate-like member 2 and the second plate-like member 3 than in another part (the part other than the bonded part 6) of the first plate-like member 2 and the second plate-like member 3 (see a graph of "the amount of the bonding agent" in FIG. 2).

Figure 4:
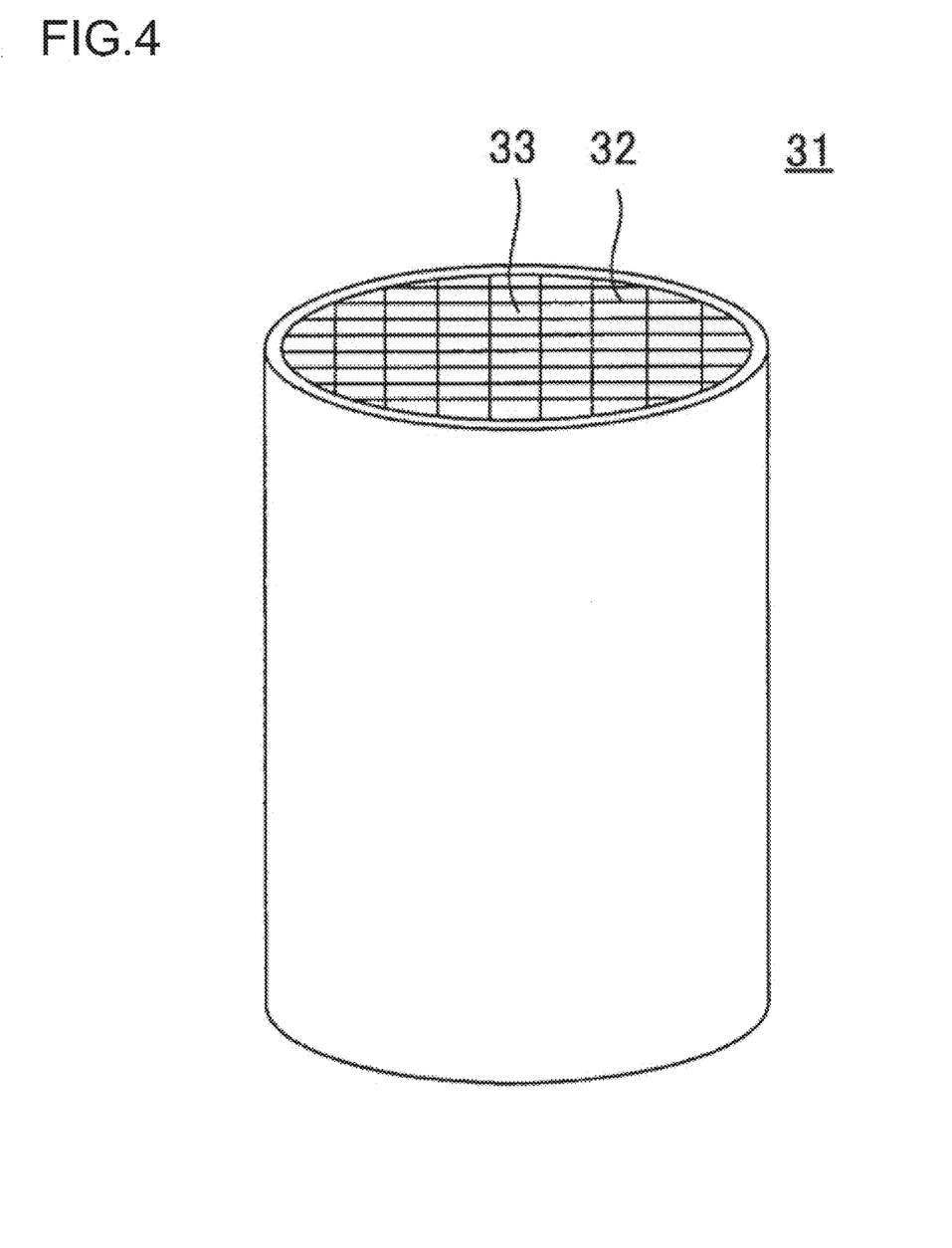
FIG. 4 is a perspective view showing a honeycomb structure formed by extrusion using the die for forming the honeycomb structure shown in FIG. 1.

In the honeycomb structure forming die 1 of the present invention, the forming material introduced from introducing portions 11 into the back pores 4 is supplied to the slits 5, and finally extruded through lattice-like open injecting portions 12. The honeycomb structure forming die 1 of the present invention is used in this manner (FIGS. 1 to 3) to form a honeycomb structure 31 having lattice-like partition walls 32 as shown in, for example, a perspective view of FIG. 4.

In the honeycomb structure forming die 1 of the present invention, the bonding agent is dispersed in a less amount in the bonded part 6, whereby the hardness of the bonded part 6 can be higher than that of the other part (the part other than the bonded part 6) (comparison between the graph of "the bonding agent" and a graph of "the hardness" in FIG. 2).

The "bonded part" 6 mentioned herein is a part in the vicinity of a bonded interface 7 where the first plate-like member 2 and the second plate-like member 3 are bonded, and is specifically a region having a distance from the bonded interface 7 in a range of 6 mm or less.

"The bonding agent is dispersed in a less amount" mentioned herein is, in other words, a state in which the content of the bonding agent in a target part is small. "The content of the bonding agent" mentioned herein is the content (mass %) of the bonding agent measured by element analysis (EDS, EDX or the like). When the content of the bonding agent is measured by an energy dispersion type X-ray (EDX) analysis device, the content of the bonding agent in a small area (about 1 $mm^2$) irradiated with an incident electron beam is indicated. That is, "the bonding agent is dispersed in a less amount in the bonded part 6" is a state in which the value of the content of the bonding agent in the bonded part 6 of the honeycomb structure forming die 1 measured by the above-mentioned technique is smaller than that of the content of the bonding agent in the other part of the honeycomb structure forming die 1.

In the honeycomb structure forming die 1 of the present invention, with respect to the shapes, sizes and numbers of the back pores 4 and the slits 5, the same configurations as those of a heretofore known die for forming the honeycomb structure or those usually designable by a person with ordinary skill can be applied.

The honeycomb structure forming die 1 of the present invention may be provided with squeezing portions 8 for compressing the forming material while once storing the material.

"The squeezing portion" is, for example, the squeezing portion 8 shown in the sectional view of FIG. 2, that is, a portion of a fluid channel such as the back pore 4 and the slit 5 where the forming material flows, which is provided so that the width of the fluid channel gradually decreases from the upstream side to the downstream side in the extruding direction of the forming material. In the honeycomb structure forming die 1 provided with the squeezing portions 8, the forming material is once stored and compressed in all of the squeezing portions 8, and then the uniform forming material having a high density is extruded through all of the fluid channels on the downstream side. In consequence, the honeycomb structure 31 constituted of the dense partition walls 32 can be formed.

The flowing material is compressed in the squeezing portions 8, so that a large load is applied from the flowing material to the inner walls of the squeezing portions 8. Therefore, the inner walls of the squeezing portions 8 preferably have an especially high wear resistance. When the honeycomb structure forming die 1 of the present invention is provided with the squeezing portions 8, the squeezing portions 8 may be positioned in the bonded part 6 having a high hardness (FIGS. 2 and 3). It is to be noted that in the present description, the squeezing portions 8 are referred to as back pore squeezing portions 8a in the back pores 4 and as slit squeezing portions 8b in the slits 5.

Hereinafter, "the super hard alloy" and "the dispersion of the bonding agent in the bonded part" characterizing the die for forming the honeycomb structure according to the present invention will first be described in detail, and configurations such as "the back pores" and "the slits" for effectively utilizing the characteristics of the super hard alloy and the bonded part will successively be described.

A-2. Super Hard Alloy:

In the honeycomb structure forming die 1 of the present invention, both of the first plate-like member 2 and the second plate-like member 3 are made of the super hard alloy containing tungsten carbide and the bonding agent.

"The super hard alloy" mentioned herein is also referred to as a tungsten carbide super hard alloy, and is an alloy obtained by sintering at least tungsten carbide and bonding agent.

Furthermore, the above bonding agent is preferably at least one metal selected from the group consisting of cobalt (Co), iron (Fe), nickel (Ni), titanium (Ti) and chromium (Cr). The super hard alloy in which at least one metal selected from the above group is used as the bonding agent is especially excellent in wear resistance and mechanical strength. Additionally, in the honeycomb structure forming die 1 of the present invention, cobalt is more preferably selected as the bonding agent.

When cobalt is used as the bonding agent, the content of cobalt is preferably 5 to 25 mass %. If the content of cobalt is less than 5 mass %, the super hard alloy unfavorably becomes brittle. Moreover, if the content of cobalt exceeds 25 mass %, the hardness lowers, and hence a slit part or the like is unfavorably easily worn during formation.

It is to be noted that in the honeycomb structure forming die 1 of the present invention, the composition of the super hard alloy of the first plate-like member 2 may be the same as or different from that of the super hard alloy of the second plate-like member 3.

A-3. Dispersion of Bonding agent in Bonded Part

In the honeycomb structure forming die 1 of the present invention, as can be understood from the comparison between the structure of the honeycomb structure forming die 1 and the graph of the amount of the bonding agent shown side by side in FIGS. 2 and 3, the bonding agent is dispersed in a less amount in the bonded part 6 in the vicinity of the bonded interface 7 where the first plate-like member 2 and the second plate-like member 3 are bonded, as compared with the other part (the part other than the bonded part 6).

In the honeycomb structure forming die 1 of the present invention, the content of the bonding agent in the bonded part 6 is preferably 5 to 6 mass %. Owing to the content of the bonding agent in such a range of numeric values, the hardness of the bonded part 6 increases, whereby it is possible to obtain effects such as the improvement of the wear resistance of the squeezing portions and the prevention of cells from falling down during the formation.

Moreover, the honeycomb structure forming die 1 of the present invention is characterized in that the bonding agent is dispersed in a less amount in the bonded part 6 than in the other part. Specifically, the average content of the bonding agent in the bonded part 6 is preferably 0.2 time or more and less than 1.0 time the average content of the bonding agent in the other part (the part other than the bonded part 6).

The honeycomb structure forming die 1 of the present invention preferably has a configuration in which the bonding agent is dispersed in the least amount in the bonded interface 7 where the first plate-like member 2 and the second plate-like member 3 are bonded, and dispersed so as to continuously or stepwise decrease toward the bonded interface 7 in each of the first plate-like member 2 and the second plate-like member 3. "The graph of the amount of the bonding agent" shown in FIGS. 2 and 3 shows one configuration in which the amount of the dispersed bonding agent continuously decreases toward the bonded interface.

A-4. Back Pore:

In the honeycomb structure forming die 1 of the present invention, the back pores 4 are formed so as to extend through the first plate-like member 2 in the thickness direction 10 (see FIGS. 1 and 2). It is to be noted that in the honeycomb structure forming die 1 of the present invention, a plurality of back pores 4 are formed in the first plate-like member 2.

The back pores 4 are fluid channels through which the forming material first flows among fluid channels of the forming material provided in the honeycomb structure forming die 1. Specifically, each of the back pores 4 has the introducing portion 11 opened at one end thereof in one surface of the first plate-like member 2, and extends through the first plate-like member 2 in the thickness direction 10 of the honeycomb structure forming die 1. At the other end of the back pore 4 opposite to the introducing portion 11, the back pore is connected to each of the slit 5. In consequence, the forming material introduced from the introducing portions 11 into the back pores 4 is supplied to the slits 5.

In the honeycomb structure forming die 1 of the present invention, the back pores 4 are preferably provided at such positions as to communicate with intersections of the lattice-like slits 5 (see FIGS. 1 and 2). When the back pores 4 are provided at the intersections of the slits 5 in the honeycomb structure forming die 1 of the present invention, during the extrusion, the forming material introduced into the back pores 4 can evenly be spread in all of the slits 5 to realize high forming properties.

It is to be noted that "the back pores extend in the thickness direction" mentioned herein means that the back pores 4 extend from one surface of the first plate-like member 2 (the surface thereof on the side of the introducing portions 11) to the other surface thereof (the surface thereof on the side of the bonded interface 7).

In the honeycomb structure forming die 1 of the present invention, the diametric shapes and sizes of the back pores 4 provided in the first plate-like member 2 can appropriately be determined by the forming material or the shape of the honeycomb structure formed by the extrusion. The diametric size of each back pore 4 is preferably 0.1 to 10 mm, further preferably 0.5 to 3 mm.

In the honeycomb structure forming die 1 of the present invention, from the viewpoint that the forming material having a high density can be supplied to all of the slits 5 to realize satisfactory forming properties, the back pores 4 are preferably provided with the squeezing portions 8a for decreasing the widths of the fluid channels toward the slits 5.

In the honeycomb structure forming die 1 of the present invention, the shape of each back pore 4 is most preferably determined so that the wall surface of the back pore 4 at a portion of the back pore 4 to which a large load is applied from the flowing forming material corresponds to a portion of the super hard alloy having a high hardness. In the honeycomb structure forming die 1 of the present invention, from the viewpoint that the durability against wear due to the forming material be effectively exerted, the back pore squeezing portion 8a which easily receives the frictional load of the forming material during the compression of the forming material is more preferably provided at the end of the back pore 4 on the side of the bonded interface 7, that is, the bonded part 6 having a high hardness. In consequence, even when the honeycomb structure forming die 1 is used for a long period of time, the satisfactory forming properties can be maintained.

Moreover, in the honeycomb structure forming die 1 having the configuration in which the bonding agent is dispersed in the least amount in the bonded interface 7, and dispersed so as to continuously or stepwise decrease toward the bonded interface 7 in each of the first plate-like member 2 and the second plate-like member 3, the hardness of the super hard alloy continuously or stepwise increases toward the bonded interface 7 (see "the graph of the hardness" in FIGS. 2 and 3). For example, when positions having an equal distance from the bonded interface 7 have an equal hardness in the first plate-like member 2, to efficiently exert the effect of the wear resistance of the bonded part 6 having the high hardness and to uniformly cause the wear on the back pores 4, the back pores 4 may be formed so as to extend in a direction parallel to the thickness direction of the first plate-like member 2. As to the shape of each back pore 4, the back pore 4 may have a wall surface which is symmetric with respect to the central axis in the extending direction of the back pore.

A-5. Slit:

In the honeycomb structure forming die 1 of the present invention, like the slits 5 shown in the perspective view of FIG. 1 and the sectional view of FIG. 2, the second plate-like member 3 is provided with the slits 5 connected to the back pores 4. In the slits 5, the lattice-like injecting portions 12 are opened in the surface of the die opposite to the bonded interface 7 where the slits communicate with the back pores 4.

In the honeycomb structure forming die 1 of the present invention, there is not any special restriction on the shape of each slit 5 as long as the shape corresponds to that of each partition wall 32 of the honeycomb structure 31 formed by using this die. When the honeycomb structure forming die 1 of the present invention is provided with, for example, slits having widths of 0.05 to 1 mm and depths of 2 to 6 mm, a sufficient forming performance can be provided.

In the honeycomb structure forming die 1 of the present invention, from the viewpoints that the uniform amount of the forming material can be supplied by extrusion to all of the slits 5 and that the forming material having the high density can be extruded through the slits, the slits 5 are preferably provided with the slit squeezing portions 8b which decrease, toward the injecting portions 12, the widths of the fluid channels at portions of the slits on the upstream side in the extruding direction of the forming material.

In the honeycomb structure forming die 1 provided with the slit squeezing portions 8b in this manner, during the extrusion, the forming material is once stored and compressed in all of the slit squeezing portions 8b, and then the forming material having the high density is uniformly extruded through all of the slits 5 on the downstream side.

Furthermore, in the honeycomb structure forming die 1 of the present invention, from the viewpoint that the durability against the wear due to the forming material be effectively exerted, the slit squeezing portion 8b which easily receives the frictional load of the forming material during the compression of the forming material is more preferably provided at the end of the slit 5 on the side of the bonded interface 7, that is, the bonded part 6 having the high hardness. In consequence, even when the honeycomb structure forming die 1 is used for a long period of time, the satisfactory forming properties can be maintained.

A-6. Other Embodiments:

The honeycomb structure forming die 1 has been described above with reference to FIGS. 1 to 3 showing the die in which the lattice-like slits 5 are formed only in the second plate-like member 3 by cutting the member. The end of each slit 5 connected to the back pore 4 may be positioned in the first plate-like member 2 on the side of the bonded interface 7. In this case, a bottom wall 13 of the slit is present in the first plate-like member 2 (it is to be noted that the bottom wall 13 of the slit is present in the bonded interface 7 in FIGS. 1 to 3). Alternatively, the end of the back pore 4 on the upstream side may be positioned in the second plate-like member 3. In this case, the bottom wall 13 of the slit is present in the second plate-like member 3. Also in the honeycomb structure forming die 1 having such a configuration, a portion of the back pore 4 and the slit 5 which wears most is preferably aligned with the bonded part 6 having the high hardness.

In another embodiment of the honeycomb structure forming die 1 of the present invention, for example, the first plate-like member 2 may be constituted of two plate-like members made of a super hard alloy. In the case of the first plate-like member 2 having such a configuration, the bonding agent may be dispersed in a less amount in "a second bonded part" where the two plate-like members are bonded than in another part (the part other than "the second bonded part" in the first plate-like member 2). This "second bonded part" has a shape corresponding to that of the back pore 4 which easily wears, whereby the characteristics of "the second bonded part" having a high hardness can effectively be utilized in the embodiment.

The honeycomb structure forming die 1 of the present invention described above can be obtained by the following manufacturing method (the manufacturing method of the die for forming the honeycomb structure according to the present invention).

B. Manufacturing Method of Die for forming Honeycomb Structure:

B-1. Outline of Manufacturing Method of Die for forming Honeycomb Structure of the Present Invention:

A manufacturing method of a die for forming a honeycomb structure according to the present invention (hereinafter referred to as "the manufacturing method of the present invention") first has a first plate-like member preparation step and a second plate-like member preparation step (FIGS. 5A(I-1) and (I-2)). The first plate-like member preparation step and the second plate-like member preparation step are steps of forming a super hard material containing tungsten carbide and the bonding agent into a plate-like shape, followed by preliminary sintering, and by these steps, the first plate-like member 2 and the second plate-like member 3 are prepared. Next, the manufacturing method of the present invention will be described with reference to FIG. 5A(II) schematically showing the embodiment. The manufacturing method has a back pore processing step of forming the back pores 4 extending in the thickness direction 10 through the first plate-like member 2 by use of a drill 24 or the like. Subsequently, in the manufacturing method of the present invention, a sintering step of sintering the first plate-like member and the second plate-like member in vacuum at 1300 to 1600° C. for 0.5 to 100 hours is performed (FIGS. 5A(I-2) and (II)). In the manufacturing method of the present invention, after the sintering step, there is performed a bonding step of superimposing the first plate-like member 2 and the second plate-like member 3 on each other to obtain a die precursor 23 as schematically shown in FIG. 5B(III), and heating this die precursor 23 at 1400 to 1500° C. for one to ten hours while applying a pressure of 10 MPa or less in the thickness direction 10 toward the contact surface of the first plate-like member 2 and the second plate-like member 3, that is, the bonded interface 7. Furthermore, in the manufacturing method of the present invention, after the bonding step, as shown in FIG. 5B(IV) schematically showing the embodiment, a slit processing step of forming the slits 5 connected to the back pores 4 in the second plate-like member 3 of the die precursor 23 by use of a diamond grindstone 26 or the like is performed.

In the manufacturing method of the present invention, first the first plate-like member preparation step and the second plate-like member preparation step are performed, and next the sintering step is performed in order. Subsequently, in the manufacturing method of the present invention, the bonding step of the first plate-like member 2 and the second plate-like member 3 subjected to the sintering step is performed. It is to be noted that in the manufacturing method of the present invention, there is not any special restriction on the order of the back pore processing step. However, after the sintering step, the hardness of the first plate-like member 2 increases, and a ground volume for processing the back pores is large, so that in the manufacturing method of the present invention, the back pore processing step is preferably performed before the sintering step. On the other hand, in the manufacturing method of the present invention, there is not any special restriction on the order of the slit processing step. However, the slits 5 having very small widths are formed by the grinding, and hence the slit processing step is preferably performed after the bonding step having a state in which the hardness of the second plate-like member 3 is sufficiently high.

In the manufacturing method of the present invention, the bonding agent in the die precursor 23 volatilizes in the vicinity of the bonded interface 7 in the bonding step (see FIG. 2). Consequently, by the manufacturing method of the present invention, the honeycomb structure forming die 1 (the honeycomb structure forming die 1 of the present invention described above) can be obtained in which the bonding agent is dispersed in a less amount in the bonded part 6 where the first plate-like member 2 and the second plate-like member 3 are bonded than in the other part (the part other than the bonded part 6) (see the graph of "the amount of the bonding agent" in FIGS. 2 and 3). In consequence, by the manufacturing method of the present invention, the honeycomb structure forming die 1 can be obtained in which the hardness of the bonded part 6 is higher than that of the other part (the part other than the bonded part 6) (see the graph of "the hardness" in FIGS. 2 and 3).

Figure 5A:
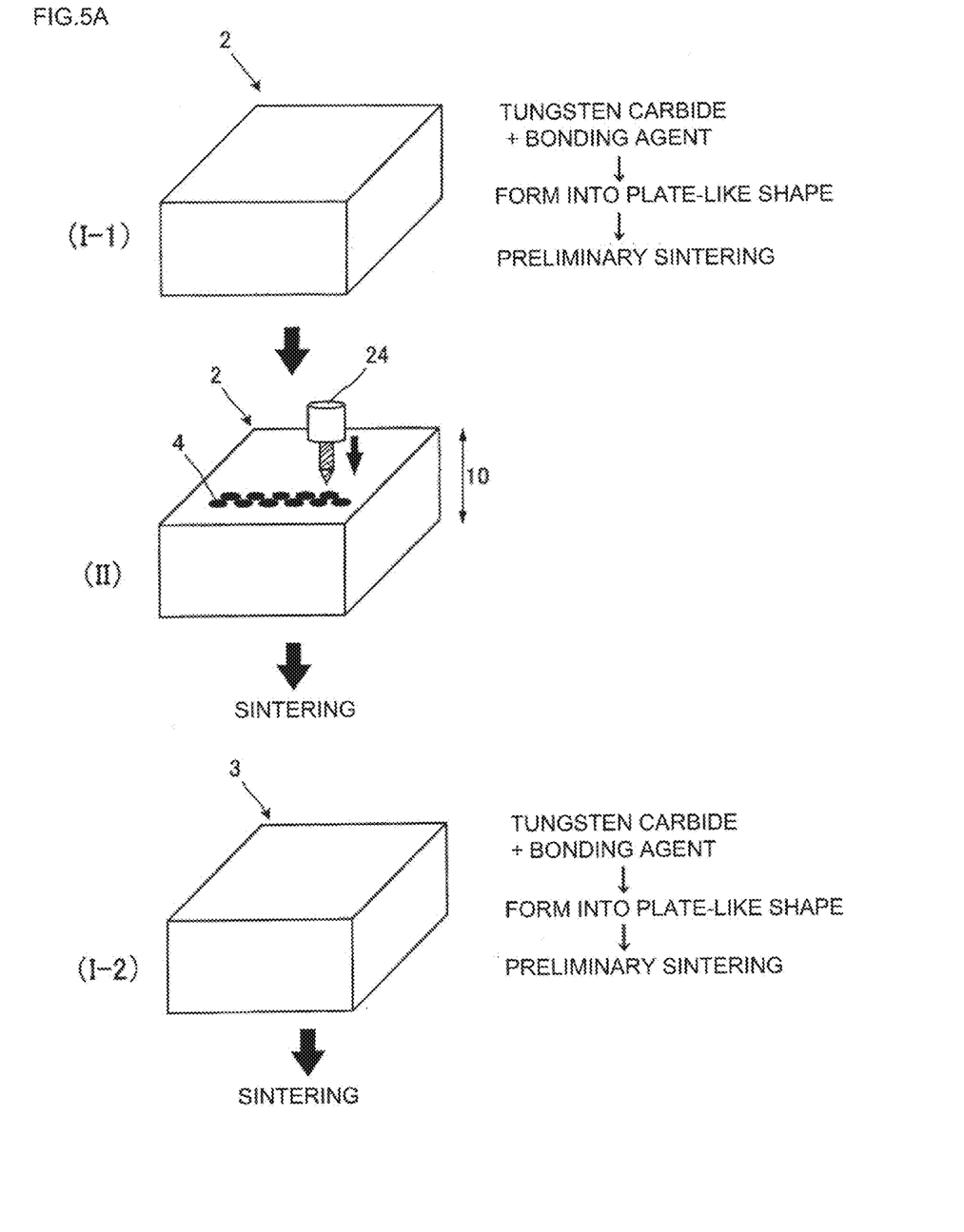
FIG. 5A is a diagram schematically showing a part of one embodiment of a manufacturing method of a die for forming a honeycomb structure according to the present invention.
Figure 5B:
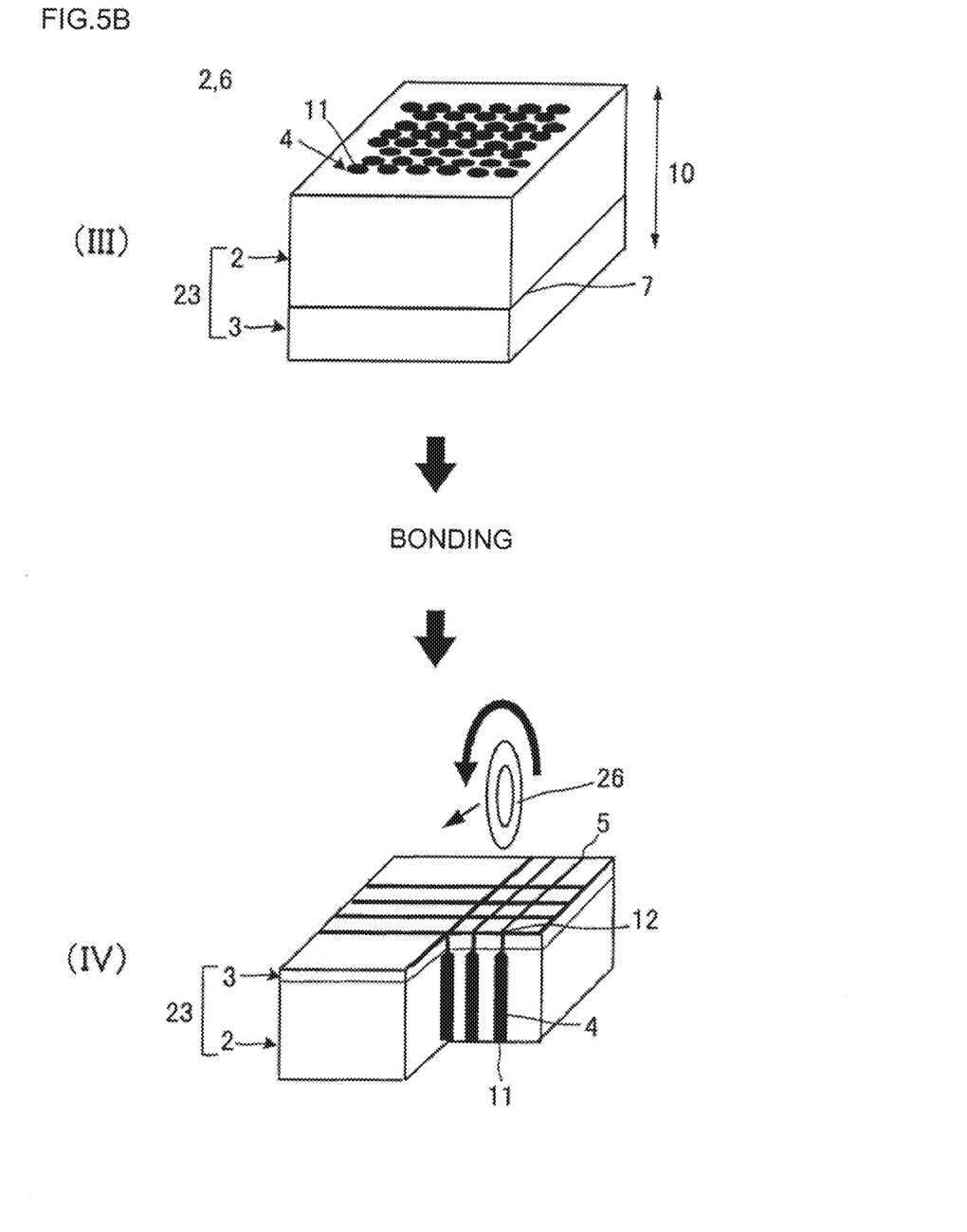
FIG. 5B is a diagram schematically showing a part of the embodiment of the manufacturing method of the die for forming the honeycomb structure according to the present invention.

B-2. Description of Steps of Manufacturing Method of Die for forming Honeycomb Structure according to the Present Invention:

B-2-1. First Plate-like Member Preparation Step and Second Plate-like Member Preparation Step:

The first plate-like member preparation step and the second plate-like member preparation step are steps of forming the super hard material containing tungsten carbide and the bonding agent into a plate-like shape, followed by the preliminary sintering, whereby the first plate-like member 2 and the second plate-like member 3 are prepared (see FIG. 5A(I-1) and (I-2)).

B-2-1-1. Super Hard Material:

The super hard material used in the manufacturing method of the present invention is prepared by mixing a tungsten carbide powder, a bonding agent such as cobalt and another component powder.

In the manufacturing method of the present invention, the amount of the tungsten carbide powder mixed to prepare the super hard material is preferably 75 to 95 mass %. The amount of the similarly mixed bonding agent is preferably 5 to 25 mass %. The bonding agent used in the manufacturing method of the present invention contains, for example, 5 to 25 mass % of cobalt (Co), and may additionally contain a small amount of nickel (Ni), iron (Fe) or the like.

The bonding agent contained in this super hard material is preferably at least one metal selected from the group consisting of cobalt (Co), iron (Fe), nickel (Ni), titanium (Ti) and chromium (Cr). Furthermore, as the bonding agent used in the manufacturing method of the die for forming the honeycomb structure according to the present invention, cobalt is more preferably selected.

It is to be noted that the super hard material used in the manufacturing method of the die for forming the honeycomb structure according to the present invention may contain a small amount of TiC or TaC.

In the first plate-like member preparation step and the second plate-like member preparation step, the super hard material prepared by the above technique is formed into the plate-like shape by a cold isotropic pressurizing (CIP) method or the like. It is to be noted that in the manufacturing method of the present invention, there is not any special restriction on the technique for forming the super hard material into the plate-like shape, as long as the die for forming the honeycomb structure having the configuration described above in detail can be obtained. By a technique usually used by a person with ordinary skill, the tungsten carbide powder and the powder of the bonding agent of cobalt or the like may be mixed, and this mixture may be formed into the plate-like shape.

Moreover, the sizes of the first plate-like member 2 and the second plate-like member 3 may appropriately be designed in accordance with the size of the honeycomb structure formed by the extrusion using the honeycomb structure forming die 1. Similarly, there is not any special restriction on the thicknesses of the first plate-like member 2 and the second plate-like member 3, as long as the minimum depths of the back pores 4 and the slits 5 can be secured to such an extent that the honeycomb structure forming die 1 as a final product can exert the forming performance.

In the manufacturing method of the present invention, the first plate-like member 2 and the second plate-like member 3 are superimposed on each other. From the viewpoint that a bonding strength between both the members be increased, both of the first plate-like member 2 and the second plate-like member 3 are preferably formed so that the bonded interface 7 which comes in contact with both the members is flat and smooth.

B-2-1-2. Preliminary Sintering:

In the manufacturing method of the present invention, a formed article obtained by forming the super hard material into the plate-like shape as described above is preliminarily sintered, thereby preparing the first plate-like member 2 and the second plate-like member 3. In the manufacturing method of the present invention, the plate-like formed article of the super hard material is preliminarily sintered at 300 to 1000° C. under a pressure of 0 to 1 Pa in an atmosphere of hydrogen or the like for 0.5 to 50 hours.

B-2-2. Back Pore Processing Step:

In the back pore processing step of the manufacturing method of the present invention, as shown in FIG. 5A(II) schematically showing the embodiment, the back pores 4 extending in the thickness direction are formed in the first plate-like member 2 of the die precursor by use of the drill 24 or the like. In this back pore processing step, there is not any special restriction on a technique for forming the back pores 4, and a heretofore known method by mechanical processing with the drill or the like may preferably be used. It is to be noted that there is not any special restriction on the diametric size of the back pore 4, the shape of the back pore 4 including the back pore squeezing portion 8a or the like, as long as the technique usually used by the person with ordinary skill is employed so that the honeycomb structure forming die 1 can be obtained as described above. This will be described with reference to the sectional view of the honeycomb structure forming die 1 in FIG. 2. The back pore squeezing portion 8a may be formed in a portion having a distance of 2 mm or less from the bonded interface 7. In consequence, the back pore squeezing portion 8a is formed in the portion of the first plate-like member 2 where the content of the bonding agent is small, that is, the portion having the high hardness.

B-2-3. Sintering Step:

In the sintering step of the manufacturing method of the die for forming the honeycomb structure according to the present invention, the die precursor is sintered in vacuum at 1300 to 1600° C. for 0.5 to 100 hours. It is to be noted that if the above temperature can be set in the vacuum environment, there is not any special restriction on a device used in the sintering step.

B-2-4. Bonding Step:

In the bonding step of the manufacturing method of the present invention, after the sintering step, the first plate-like member 2 and the second plate-like member 3 are superimposed on each other to obtain the die precursor 23 as schematically shown in FIG. 5B(III). Furthermore, this die precursor 23 is heated at 1400 to 1500° C. for one to ten hours while applying a pressure of 10 MPa or less in the thickness direction 10 toward the contact surface of the first plate-like member 2 and the second plate-like member 3, that is, the bonded interface 7, thereby performing the bonding step. Usually until the completion of the sintering step, the bonding agent is evenly dispersed in the first plate-like member 2 and the second plate-like member 3 regardless of the bonded part 6 and the other part. Through this bonding step, the bonding agent volatilizes in the vicinity of the bonded interface 7, and the bonding agent is dispersed in a less amount in the bonded part 6 between the first plate-like member 2 and the second plate-like member 3 than in the other part as schematically shown in FIG. 2.

Furthermore, to obtain the configuration in which the bonding agent is dispersed in the least amount in the bonded interface 7, and dispersed so as to continuously or stepwise decrease toward the bonded interface 7 in each of the first plate-like member 2 and the second plate-like member 3, the bonding step may be performed so that the bonding agent easily volatilizes from the back pores 4. To obtain a state in which the bonding agent easily volatilizes from the back pores 4, for example, the following embodiment may be employed. First, when the first plate-like member 2 and the second plate-like member 3 are vertically superimposed on each other in the die precursor 23 and the pressure of 10 MPa or less is applied to the bonded interface 7 in the thickness direction 10 by use of the weight of the plate-like member disposed on the upside, as shown in the schematic diagram of FIG. 5B(III), the first plate-like member 2 may be disposed on the upside. According to this embodiment, the back pores 4 are still opened, and the bonding agent which has volatilized into the back pores 4 is discharged to the outside. Alternatively, for example, when the die precursor 23 is sandwiched between press plates to apply the pressure of 10 MPa or less to the bonded interface 7 of the die precursor in the thickness direction 10, the press plate brought into contact with the first plate-like member 2 may be provided with through pores so that the back pores 4 are not closed with the press plate brought into contact with the first plate-like member 2. The through pores provided in this press plate may be arranged so as to communicate with the back pores 4, when the press plate comes in contact with the first plate-like member 2. In consequence, the bonding agent which has volatilized into the back pore 4 passes through the through pores and is discharged to the outside. It is to be noted that at least the through pores connected to all the back pores 4 are preferably provided in the above press plate. That is, the embodiment is preferable in which spaces in the back pores 4 are connected to the outside so that the bonding agent which has volatilized into the back pores 4 is discharged to the outside in the bonding step.

B-2-5. Slit Processing:

The embodiment will be described with reference to a schematic diagram of FIG. 5B(IV). In the slit processing step of the manufacturing method of the present invention, the slits 5 connected to the back pores 4 are formed in the second plate-like member 3 by use of the grindstone 26 or the like. Alternatively, in this slit processing step, the slits may be formed by grind processing with the diamond grindstone or electric discharge machine processing (EDM processing). In the embodiment of the slit processing step, the slits may be formed by the grinding so as to obtain a configuration (see FIG. 2) in which a part of the bottom wall 13 of each slit is opened by the back pore 4 beforehand formed by the grinding to connect the slit 5 to the back pore 4. As shown in, for example, FIG. 5B(IV), the slit processing step may be performed by grinding the surface of the second plate-like member 3 (the surface thereof opposite to the bonded interface 7)

by use of the diamond grindstone 26. It is to be noted that there is not any special restriction on the width or depth of the slit 5, the shape of the slit 5 including the slit squeezing portion 8b and the like, as long as a configuration usually used by the person with ordinary skill can be employed so as to obtain the honeycomb structure forming die 1 as described above.

EXAMPLES

Hereinafter, the present invention will be described with respect to examples in more detail, but the present invention is not limited to these examples.

C-1. Manufacturing of Die for forming Honeycomb Structure:

Example 1

(1) First Plate-like Member Preparation Step and Second Plate-like Member Preparation Step:

For the preparation of a first plate-like member 2, 92 mass % of tungsten carbide (WC) powder and 8 mass % of cobalt (Co) (additionally a small amount of titanium carbide (TiC), tantalum carbide (TaC), nickel (Ni) or iron (Fe)) were mixed. This mixture was formed into a ϕ260 mm circular plate-like shape having both of front and back surfaces with a thickness of 4 mm by a cold isotropic pressurizing (CIP) method. The obtained plate-like formed article was preliminarily sintered at 800° C. under a pressure of 5 Pa for five hours, thereby preparing the first plate-like member 2. By a method similar to that for preparing the first plate-like member, a second plate-like member 3 was prepared.

(2) Back Pore Processing Step:

Next, as shown in FIG. 5A(II), one surface of the first plate-like member 2 was ground by using a drill 24, thereby forming back pores each having an opening diameter of 2.1 mm and a depth of 32.5 mm from the surface of the first plate-like member 2 (the surface thereof opposite to a bonded interface 7) (through processing). It is to be noted that the back pores 4 were arranged in the surface of the first plate-like member 2 so as to leave a gap of 1.8 mm between the back pores in each of a vertical direction and a horizontal direction.

(3) Sintering Step:

After processing the back pores, a die precursor 23 was sintered in vacuum at 1500° C. for five hours.

(4) Bonding Step:

After the sintering step, the surfaces of the first plate-like member 2 and the second plate-like member 3 were polished, respectively. Next, as shown in FIG. 5B(III), the first plate-like member 2 and the second plate-like member 3 were superimposed on each other to obtain the die precursor 23, and this die precursor 23 was heated at 1450° C. for one hour while applying a pressure to a bonded interface 7 in a thickness direction 10, thereby preparing the die precursor 23 in which the first plate-like member 2 and the second plate-like member 3 were bonded. It is to be noted that the die precursor 23 was pressurized in the thickness direction 10 by use of the weight of the first plate-like member 2 superimposed on the second plate-like member 3. According to calculation from the mass of the first plate-like member 2, the pressure applied to the bonded interface 7 of the die precursor 23 in the thickness direction 10 was in a range of 0.001 to 0.01 MPa.

(5) Slit Processing Step:

After the bonding step, as schematically shown in FIG. 5B(IV), (lattice-like) slits 5 each having a width of 0.3 mm and a depth of 4 mm were formed by grinding with a disc-like diamond grindstone 26 (the slicer 26). Finally, the outer periphery of the die precursor was processed to obtain a honeycomb structure forming die 1 of Example 1.

Comparative Example 1

A honeycomb structure forming die 1 of Comparative Example 1 was obtained by the same method as the manufacturing method of the die for forming the honeycomb structure in Example 1, except that "blind hole processing" was performed in the back pore processing step (2), and the bonding step (4) was omitted.

Figure 6:
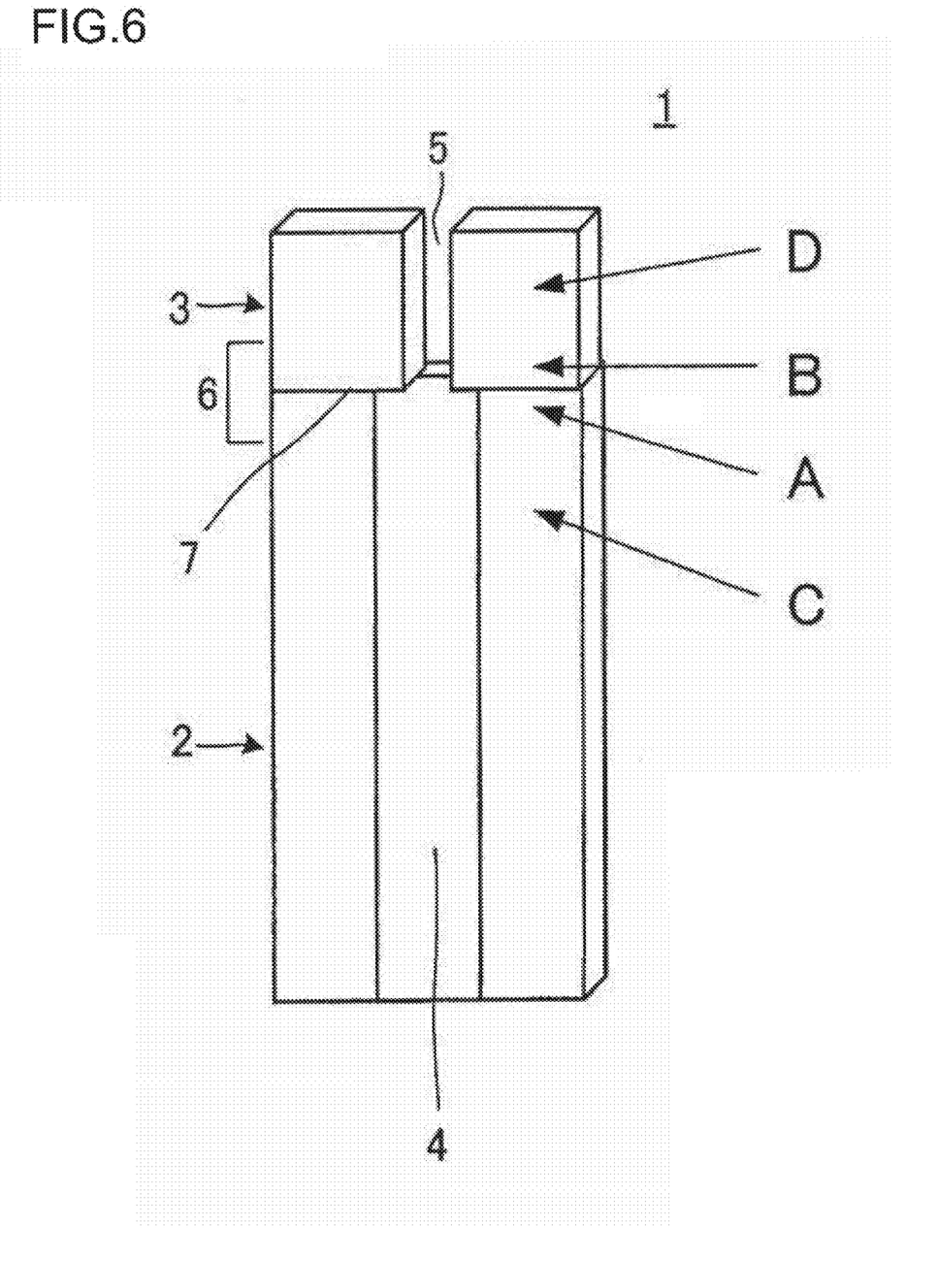
FIG. 6 shows a sectional perspective view of the partial structure of the die for forming the honeycomb structure, including one back pore and one slit, and a schematic diagram indicating measurement points of the content and hardness of a bonding agent in Example 1 and Comparative Example 1.

C-2: Measurement of Content of Cobalt (Bonding Agent):

In Example 1 and Comparative Example 1, after the bonding step, the distribution of the content of cobalt in the die precursor 23 was measured by using an element analysis device (EDX, HORIBA S-4700). Measurement points are schematically shown in FIG. 6 showing a partial structure (hereinafter referred to as "the back pore-slit unit structure") of the honeycomb structure forming die 1 constituted of one back pore 4 and one slit 5. A measurement position of the bonded part 6 had a distance of 0.5 mm from the bonded interface 7, and a measurement position of the part other than the bonded part 6 had a distance of 1.5 mm from the bonded interface 7. A measurement point A was the point of the bonded part 6 of the first plate-like member 2, a measurement point B was the point of the bonded part 6 of the second plate-like member 3, a measurement point C was the point of the other part of the first plate-like member 2, and a measurement point D was the point of the other part of the second plate-like member 3. It is to be noted that in one honeycomb structure forming die 1, the measurement points A to D of the back pore-slit unit structure present in the center of the die were measurement targets of the content of cobalt.

The content of cobalt in the die for forming the honeycomb structure prepared in Example 1 was 6 mass % at the measurement point A, 6 mass % at the measurement point B, 8 mass % at the measurement point C, and 8 mass % at the measurement point D. The content of cobalt in the die for forming the honeycomb structure prepared in Comparative Example 1 was 6 mass % at the measurement point A, 6 mass % at the measurement point B, 8 mass % at the measurement point C, and 8 mass % at the measurement point D.

C-3. Measurement of Hardness

A hardness (the HRC hardness) was measured at the measurement points A to D simultaneously with the above measurement of the content of cobalt. For the measurement of the hardness, a hardness meter (manufactured by MATSUZAWA Co., part number RMT-3) was used.

The hardness (the HRC hardness) of the die for forming the honeycomb structure prepared in Example 1 was 76 at the measurement point A, 76 at the measurement point B, 75 at the measurement point C, and 75 at the measurement point D. The hardness (the HRC hardness) of the die for forming the honeycomb structure prepared in Comparative Example 1 was 75 at the measurement point A, 75 at the measurement point B, 75 at the measurement point C, and 75 at the measurement point D.

The bonded part 6 of Example 1 had a high hardness as compared with the bonded part 6 of Comparative Example 1. The results experimentally indicate that by the manufacturing method of the present invention, it is possible to manufacture the die for forming the honeycomb structure, having a higher hardness in portions which connect the back pores to the slits and which are thus required to have a wear resistance.

The present invention can be utilized as a die for forming a honeycomb structure, having an excellent durability against wear due to a forming material, and a manufacturing method of the die.

What is claimed is:

1. A die for forming a honeycomb structure, provided with back pores through which a forming material is introduced and slits through which the forming material is extruded into a lattice-like shape, the die comprising:
   a first plate-like member made of a super hard alloy containing tungsten carbide and a bonding agent and provided with the back pores extending in a thickness direction; and
   a second plate-like member bonded to the first plate-like member, made of the super hard alloy containing tungsten carbide and the bonding agent, and provided with the slits connected to the back pores,
   wherein the bonding agent is dispersed in a lesser amount in a bonded part of the first plate-like member and the second plate-like member between the first plate-like member and the second plate-like member than in the other part of the first plate-like member and the second plate-like member.

2. The die for forming the honeycomb structure according to claim 1, wherein the bonding agent is dispersed in the least amount in a bonded interface where the first plate-like member and the second plate-like member are bonded, and dispersed so as to continuously or stepwise decrease toward the bonded interface in each of the first plate-like member and the second plate-like member.

3. The die for forming the honeycomb structure according to claim 1, wherein the bonding agent is at least one metal selected from the group consisting of cobalt (Co), iron (Fe), nickel (Ni), titanium (Ti) and chromium (Cr).

4. The die for forming the honeycomb structure according to claim 2, wherein the bonding agent is at least one metal selected from the group consisting of cobalt (Co), iron (Fe), nickel (Ni), titanium (Ti) and chromium (Cr).

5. A manufacturing method of a die for forming a honeycomb structure, comprising:
   a first plate-like member preparation step of forming a super hard material containing tungsten carbide and a bonding agent into a plate-like shape, followed by preliminary sintering, to prepare a first plate-like member;
   a second plate-like member preparation step of similarly forming the super hard material into the plate-like shape, followed by the preliminary sintering, to prepare a second plate-like member;
   a back pore processing step of forming back pores extending in a thickness direction through the first plate-like member;
   a sintering step of sintering the first plate-like member and the second plate-like member in vacuum at 1300 to 1600° C. for 0.5 to 100 hours;
   a bonding step of superimposing the first plate-like member and the second plate-like member after the sintering step to obtain a die precursor, and heating the die precursor at 1400 to 1500° C. for one to ten hours while applying a pressure of 10 MPa or less in the thickness direction to the contact surface of the first plate-like member and the second plate-like member, wherein the bonding agent is dispersed in a lesser amount in a bonded part of the first plate-like member and the second plate-like member between the first plate-like member and the second plate-like member than in the other part of the first plate-like member and the second plate-like member; and
   a slit processing step of forming slits connected to the back pores in the second plate-like member after the bonding step.

6. The manufacturing method of the die for forming the honeycomb structure according to claim 5, wherein the bonding agent is at least one metal selected from the group consisting of cobalt (Co), iron (Fe), nickel (Ni), titanium (Ti) and chromium (Cr).

7. The manufacturing method of the die for forming the honeycomb structure according to claim 5, wherein the super hard material contains at least 75 to 95 mass % of the tungsten carbide and 5 to 25 mass % of the bonding agent.

8. The manufacturing method of the die for forming the honeycomb structure according to claim 6, wherein the super hard material contains at least 75 to 95 mass % of the tungsten carbide and 5 to 25 mass % of the bonding agent.

* * * * *